(12) United States Patent
Franzpötter et al.

(10) Patent No.: US 9,446,799 B2
(45) Date of Patent: Sep. 20, 2016

(54) SUPPORT USED AS A CHASSIS COMPONENT

(75) Inventors: Thorsten Franzpötter, Attendorn (DE); Stephan Lagin, Attendorn (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 0 days.

(21) Appl. No.: 14/008,510

(22) PCT Filed: May 9, 2012

(86) PCT No.: PCT/EP2012/058545
§ 371 (c)(1),
(2), (4) Date: Sep. 27, 2013

(87) PCT Pub. No.: WO2012/156248
PCT Pub. Date: Nov. 22, 2012

(65) Prior Publication Data
US 2014/0021746 A1    Jan. 23, 2014

(30) Foreign Application Priority Data

May 17, 2011 (DE) .................... 20 2011 050 158 U

(51) Int. Cl.
*B62D 25/20* (2006.01)
*B62D 21/11* (2006.01)
(Continued)

(52) U.S. Cl.
CPC .............. *B62D 25/20* (2013.01); *B60G 7/001* (2013.01); *B62D 21/11* (2013.01); *B62D 25/00* (2013.01); *B62D 27/026* (2013.01); *B62D 29/007* (2013.01)

(58) Field of Classification Search
CPC B60K 17/22; B60K 17/24; B60R 2019/186; B60R 2019/18; B62D 25/20; B62D 25/2018; B62D 21/09

USPC .......... 180/377; 293/120; 296/146.6, 193.07; 5/377

See application file for complete search history.

(56) References Cited

U.S. PATENT DOCUMENTS 6,058,673 A * 5/2000 Wycech .................. B29C 44/18
296/187.02
6,096,403 A * 8/2000 Wycech ........................ 428/122
(Continued)

FOREIGN PATENT DOCUMENTS

DE     198 27 549 A1      12/1999
DE       102 38 668 A1     3/2004
(Continued)

OTHER PUBLICATIONS

International Search Report for parent case PCT/EP2012/058545—entire document.
(Continued)

*Primary Examiner* — James English
(74) *Attorney, Agent, or Firm* — Polson Intellectual Property Law, PC; Margaret Polson

(57) ABSTRACT

The invention relates to a support (2, 3) used as a vehicle component and comprising a longitudinal extension which corresponds to a multiple of the transverse extension thereof. Said support (2, 3) comprises a reinforced transverse profile section. For this purpose, the support (2, 3) comprises at least one reinforced element (7, 8) which follows the longitudinal extension of the support (2, 3), is connected to the support in a positive and material fit manner and in a tension and shear-resistant manner, with the insertion of a separation layer (12) between the longitudinal extension of the support (2, 3).

11 Claims, 3 Drawing Sheets

(51) Int. Cl.
  *B62D 25/00* (2006.01)
  *B60G 7/00* (2006.01)
  *B62D 27/02* (2006.01)
  *B62D 29/00* (2006.01)

(56) References Cited

U.S. PATENT DOCUMENTS

| | | | |
|---|---|---|---|
| 6,168,226 B1 | 1/2001 | Wycech | |
| 6,287,666 B1 | 9/2001 | Wycech | |
| 6,305,136 B1* | 10/2001 | Hopton | B29C 44/18 296/146.6 |
| 6,341,467 B1* | 1/2002 | Wycech | 52/834 |
| 6,455,144 B1* | 9/2002 | Wycech | 428/308.4 |
| 7,392,929 B1 | 7/2008 | Finerman | |
| 2006/0005503 A1 | 1/2006 | Bladow | |
| 2006/0090343 A1* | 5/2006 | Riley et al. | 29/897.2 |
| 2006/0152041 A1* | 7/2006 | Igarashi et al. | 296/187.02 |
| 2008/0026247 A1* | 1/2008 | Nakagawa | B23K 11/115 428/649 |
| 2008/0061602 A1* | 3/2008 | Czaplicki et al. | 296/205 |
| 2011/0104413 A1* | 5/2011 | Mendibourne et al. | 428/35.7 |
| 2012/0043019 A1* | 2/2012 | Belpaire | B29C 44/1228 156/293 |

FOREIGN PATENT DOCUMENTS

| | | | |
|---|---|---|---|
| EP | 1 052 162 A2 | 11/2000 | |
| EP | 2251250 A1 * | 11/2010 | B29C 44/1228 |

OTHER PUBLICATIONS

Written Opinion of the International Searching Authority for parent case PCT/EP2012/058545—entire document.
International Preliminary Report on Patentability, Ch. I, for parent case PCT/EP2012/058545—entire document.
Decision to Grant in related European application 12721482.3 dated Sep. 5, 2014.
English translation of granted claims in related European application 12721482.3.
International Preliminary Report on Patentability—English translation—entire document.

* cited by examiner

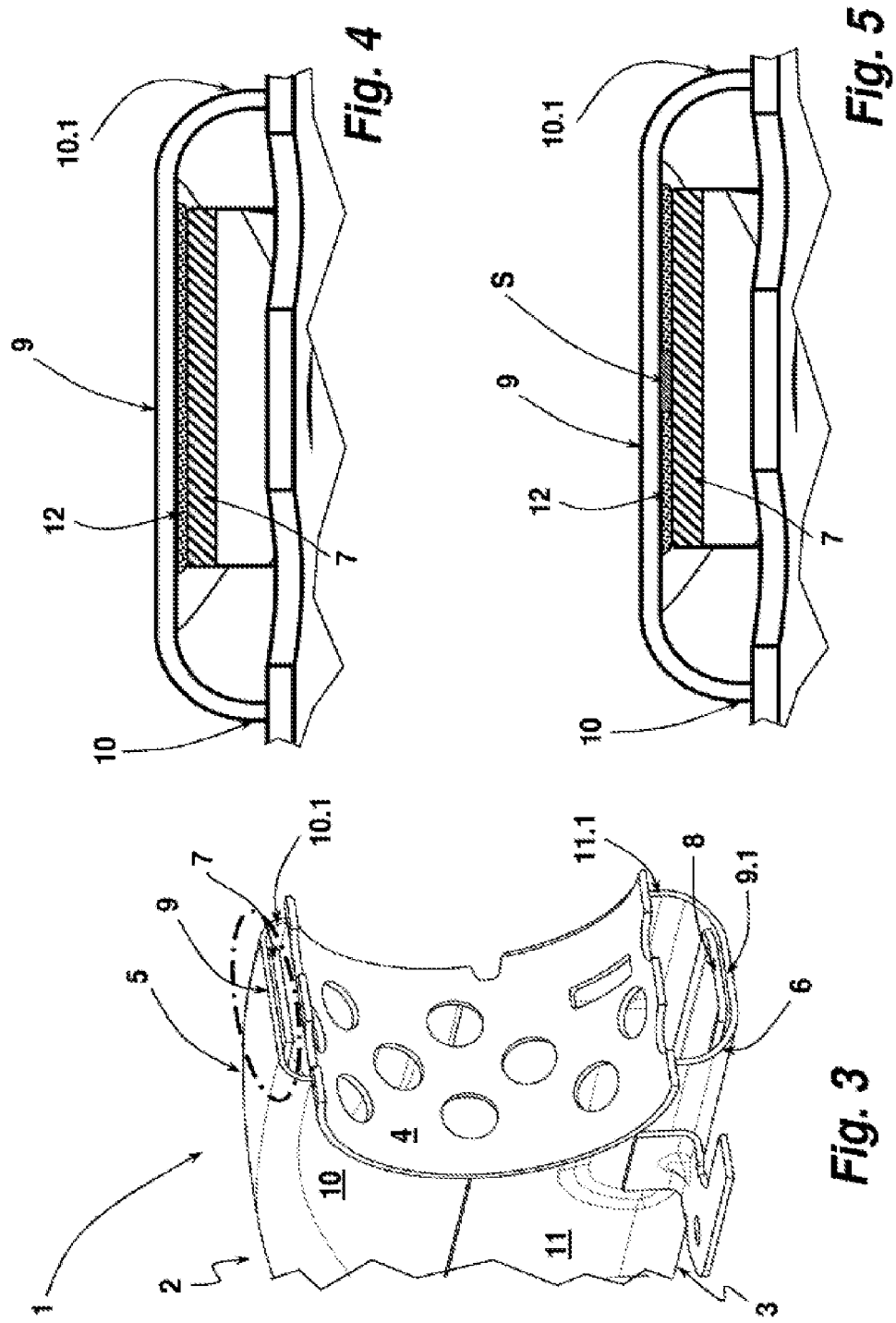

SUPPORT USED AS A CHASSIS COMPONENT

CROSS REFERENCE APPLICATIONS

This application is a National Stage application of PCT/EP2012/058545 filed May 9, 2012 claiming the priority to German application no. 20 2011 050158.2 filed May 17, 2011

BACKGROUND

The invention relates to a support used as a vehicle component, the support comprising a longitudinal extension with a multiple of transverse extension thereof, and having a transverse profile section reinforcing the support.

In vehicles, various supports are used as vehicle components. Such supports, as the word suggests, can be used as supports for certain components. One example of such a support is a transmission carrier. The supports, as vehicle components, are also used for the articulated connection of vehicle components. For example, the supports are used with the chassis frame. In the chassis frame, connecting rods are used as supports, transverse links or stabilizers for example.

Supports of the above-mentioned type can be manufactured as steel metal plate components. These supports have a transverse profile section to increase their stiffness, and they are therefore profiled transversely to their longitudinal extension. The profile section is typically designed as a U-shaped profile section. The longitudinal extension of these supports corresponds to a multiple of the transverse extension thereof. In certain designs, it is also possible to assemble two or more such supports to a vehicle component. For example, in a transmission carrier of the previously known type, in which two U-shaped profiled supports are welded to each other to form a closed box profile.

Such supports are produced from steel in a shaping process, usually a deep-drawing process, by which a metal plate blank is shaped to the three-dimensional geometry of the support. The material cost in this regard is not low. A tool set up for producing a support is adjusted not only exactly to the geometry of the support which is to be obtained, but also to the strength of the metal plate blank to be shaped.

Even if supports of the above-mentioned type meet these requirements, there still remains a demand for supports with greater bending stiffness, particularly supports that can be produced at only relatively low additional costs and with a justifiable measure of increased manufacturing cost.

SUMMARY

The invention is therefore based on the problem of proposing such a support.

The problem is solved according to the invention by a support having at least one reinforcing element along the longitudinal extension of the support, which, with the insertion of a separation layer in the longitudinal extension of the support, is connected to said support in a positive and/or material fit manner and in a tension- and shear-resistant manner.

In this support design, conventional supports, for example, supports made of profiled steel can be used with, a reinforcing element connected along the longitudinal extension of the support to increase their bending stiffness. A separation layer is arranged between the reinforcing element and the surface of the support. This separation layer spaces the reinforcing element from the surface of the support. This design achieves the formation of an upper flange and of a lower flange spaced from the former flange, which considerably increases the bending stiffness, especially in the vertical direction relative to the extension of the base element. Here it is of no importance for the invention if the spacing between the reinforcing element and the surface of the support is small, for example, a few tenths of a millimeter. The connection in a positive and/or material fit manner to the support can be achieved, by welding, where welding spots produced at intervals are preferable, or also by mechanical connection elements, such as clinching or riveting. In the case of clinching or rivets also, the tension- and shear-resistant connection of the reinforcing element to the support is carried out at spaced connection spots along the longitudinal extension of the reinforcing element.

In this design, conventional supports can be used as base bodies which are retrofitted with a reinforcing element designed according to the requirements placed on them, for example, with regard to bending stiffness. Such a support thus has a modular structure and it comprises the base body, for example, the conventional support, and at least one reinforcing element which is connected in the prescribed manner to the support. It is thus possible to use in each case a different reinforcing element depending on the respective requirements for designing the support. The possibility therefore exists of using reinforcing elements that are made of different materials compared to the base body material depending on the desired connection design. Even when using reinforcing elements made of an identical material or of similar materials, the desired bending stiffness of the support can be achieved by the selection of the width of the reinforcing element, the thickness thereof, and/or also by a profiled section of the reinforcing element itself. The thickness of the separation layer can also enter as a variable in the design of the support.

The result is that such a support is more resistant to bending than previous supports, while only a relatively small additional weight needs to be tolerated. Moreover, the additional stiffening can be carried out using simple process-technological means, so that the additional costs can be kept within limits, when using conventional supports as base body for the support to be designed. Above all, no additional costs need to be invested for new matrices and countersinking.

The separating layer is preferably also a corrosion layer, in order to protect the mutually facing surfaces of reinforcing elements and supports. Thus, such a support with its at least one reinforcing element can be subjected to an immersion painting process, wherein it is ensured that no unprotected surface areas remain. This is essential, particularly with supports made of a material that is at risk for corrosion, such as, for example, steel.

The at least one reinforcing element can also be connected, depending on the design of the support or of its base body, to the inner side or to the outer side. However, in the case of a U-shaped profiled support as base body, it is preferable to design the reinforcing elements as an insert, and to connect it to the inner side of the bottom connecting the two side arms.

According to an additional preferred design, the separating layer is designed as an adhesive layer, and thus has a friction connection both to the surface of the base body and also to the upper surface of the reinforcing element. It is particularly suitable to use adhesives which cure due to the effect of the temperature as adhesives for forming such a separating layer, for example, a crash-stable structural adhesive, since they have special binding forces. The heating step, to which an immersion-painted support has been subjected in any case for the purpose of curing the immersion paint, can be used for curing the adhesive.

It is understood that such a support can be a portion of a vehicle component which comprises several supports, in particular also several such supports, as can be the case, for example, with a transmission carrier, when the latter is designed as a closed box profile.

Additional advantages and designs of the invention can be obtained from the following description of an embodiment example in reference to the appended figures.

BRIEF DESCRIPTION OF THE DRAWINGS

FIG. 3 is a cross section through the support of FIG. 1 in the assembled state, FIG. 4 is an enlarged cross section through a section of the support of FIG. 3, outlined using a chain-dotted line, and FIG. 5 is a cross section corresponding to that of FIG. 4 at a location which is offset with respect to the cutting line of FIG. 4.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

Figure 1:
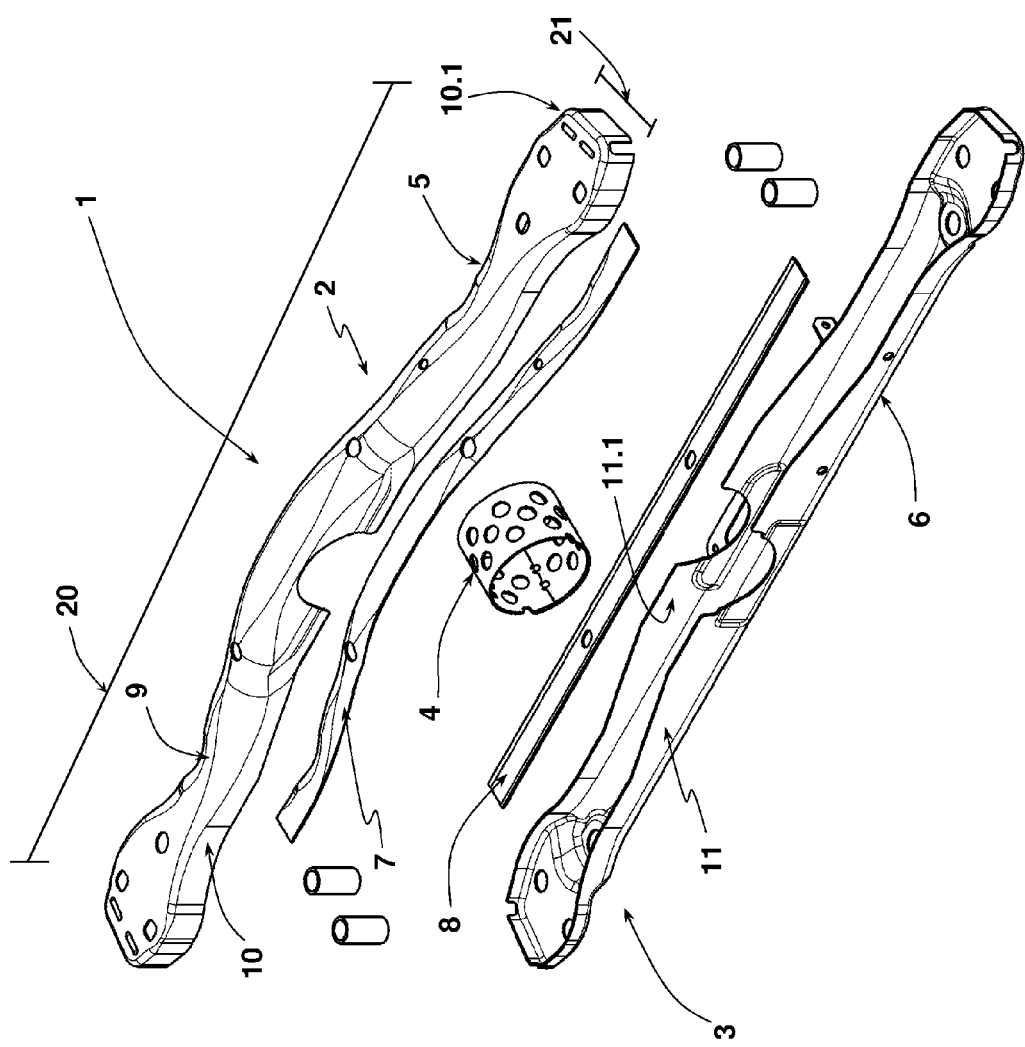
FIG. 1 is an exploded view of a transmission carrier.

A transmission carrier 1 for a vehicle comprises a first support 2 and a second support 3. The supports 2, 3 are designed in order to receive a sleeve-like transmission casing 4, to which the transmission is secured. The supports 2, 3 each consist of a base body 5 or 6, and of an insert 7 or 8, which is connected for the purpose of increasing the bending stiffness in the z direction to said base body, as a reinforcing element. The base bodies 5, 6 are steel metal plate reshaped parts, namely parts which are conventionally used for producing a transmission carrier. Each base body 5, 6 comprises a longitudinal extension 20 which corresponds to a multiple of the transverse extension 21. In the transverse direction, the two supports 5, 6 have a U-shaped profile in cross section in the depicted embodiment. The insert 7 or 8 is connected to the inner side of the respective bottom 9 or 9.1, in particular to the bottom 9 or 9.1 which connects the side walls 10, 10.1 or 11, 11.1 of the respective base body 5 or 6, walls which are beveled relative to the bottom 9 or 9.1. The contour of the respective insert 7 or 8, at its top side facing the bottom 9 or 9.1, follows the inner contour of the respective base body 5 or 6. The adaptation of the side of the insert 7 facing the base body 5 can be seen clearly in FIGS. 1 and 3.

In its assembled state, the two base bodies 5, 6 of the transmission carrier 1 are welded to each other along their mutually facing front sides. In the depicted embodiment, the transmission carrier 1 does not differ externally from a conventional one.

The two inserts 7, 8 are used to increase the bending stiffness. Below, the connection of the insert 7 to the base body 5 for the formation of the first support 2 is described. The insert 8 is connected in the same manner to the base body 6.

The base body 5 is a steel metal plate shaped part. The insert 7 is also made of steel, where the insert 7 can also be made of a steel of lower quality than the one used for the manufacture of the base body 5. Thus, the materials of base body 5 and of the insert 7 are similar materials and they can in any case be welded to each other.

Figure 2:
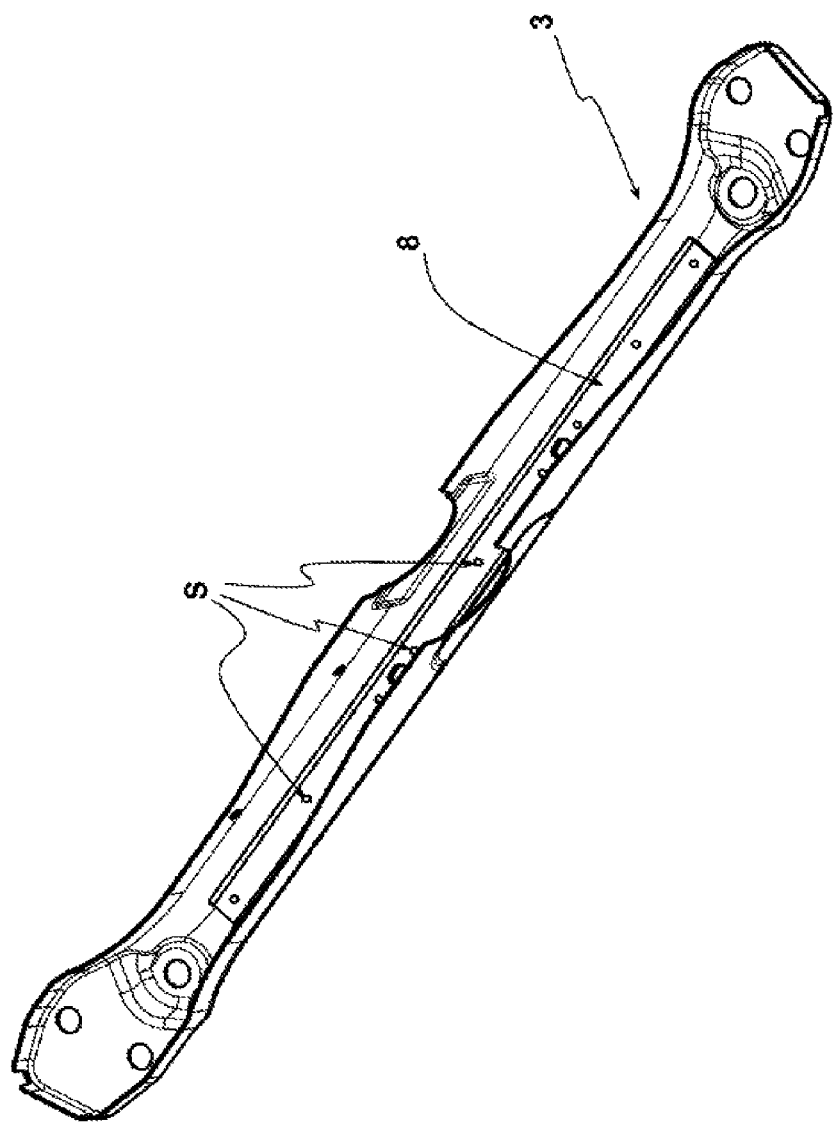
FIG. 2 is a perspective representation of a portion of the transmission carrier of FIG. 1.

The insert 7 is connected by insertion of a separating layer 12 to the inner side of the bottom 9 (see FIGS. 4 and 5; in FIG. 3, the separating layer is not represented). In the depicted embodiment, the separating layer 12 is an adhesive layer. The adhesive layer 12 extends over the entire surface of the insert 7 facing the bottom 9. As can be seen in FIGS. 3 and 4, the insert 7 is spaced by the adhesive layer 12 from the bottom 9 of the base body 5. The adhesive layer 12 is cured when exposed to a temperature of approximately 200° C. The insert 7 is connected to the base body 5 by several welding spots in a tension- and shear-resistant manner. This can be seen in FIG. 2, for example, with regard to the insert 8, which is inserted in the base body 6 and welded to the latter. The welding spots here are marked with the reference numeral S. The insert 7 is secured in the same manner to the base body 5. Over the longitudinal extension of the insert 7, the latter is connected to the base body 5 or to the bottom 9, in a material fit manner at nine welding spots arranged with approximately the same spacing from each other, in the depicted embodiment. FIG. 5 shows a cross section through a base body 5, with the insert 7 arranged therein, for the formation of the first support 2 in the area of such a welding spot connection.

Due to the separating layer 12, the insert 7 is arranged with a spacing from the bottom 9 of the base body 5, spacing which remains the same over the length of the insert. At the same time, this layer 12 is used as a corrosion protection layer. The separating layer 12 is designed so that no gap remains between bottom 9 and the insert 7.

For connecting the insert 7 to the base body 5 for the formation of the first support 2, a bead of adhesive composition is applied centrally over the entire length of the insert 7 on the upper side of the insert 7 facing the bottom 9 of the base body 5. Subsequently, the insert is positioned within the base body 5, so that the spot welding can be carried out for the point-like connection in a material fit manner of the insert 7 to the base body 5. The spot welding also occurs centrally with respect to the width of the insert 7. In order to be able to transfer the required welding current from the bottom 9 of the base body 5 to the insert 7 or vice versa, the adhesive composition is electrically conductive in the depicted embodiments. In the course of the welding process, or also as a result of a preliminary positioning of the parts that are to be connected to each other in a material fit manner, while moving the insert 7 closer to the inner side of the bottom 9, the adhesive composition bead is pushed apart, so that it is distributed over the entire upper side of the insert 7 facing the bottom 9. The adhesive composition bead is preferably dimensioned such that no excessive quantity of adhesive material swells out from the spacing gap between the insert 7 and the bottom 9.

After the two supports 2, 3 have been produced in the described manner, they are welded to each other—as is conventionally done—also on the front sides of their side walls 10, 10.1, 11, 11.1, front sides which point towards each other. In the next step, the transmission carrier 1 produced in this manner is subjected to an immersion painting process, and subsequently it is subjected to a heat treatment in order to cure the paint and the adhesive composition that has not cured so far.

In the same manner, as described in relation to the transmission carrier 1, other vehicle support components can also be reinforced, for example, transverse links or the like. It is understood that, depending on the desired degree of reinforcement, in the case of a transmission carrier as well, as claimed it is possible to design only one of the two base bodies as support, as has been described above.

The above-described design and the embodiment given as an example, with connection of the insert by welding spot connections to the respective base body, is possible with the greatest variety of geometries of the base body or of the insert. In addition, in the described spot welding, it is advantageous if the base bodies undergo no distortion in the process. Therefore, straightening of the supports 2 or 3 is not necessary.

Investigations have shown that a noteworthy increase in the bending stiffness in the z direction occurs in the case of a support already when the insert is connected to the base body in a tension- and shear-resistant manner and in a positive and material fit manner, that is to say if the separating layer is not designed as an adhesive layer. Similarly, a considerable increase in the bending stiffness can be achieved if the separating layer is designed as an adhesive layer.

LIST OF REFERENCE NUMERALS

1 Transmission carrier
2 First support
3 Second support
4 Transmission casing
5 Base body
6 Base body
7 Insert
8 Insert
9, 9.1 Bottom
10, 10.1 Side wall
11, 11.1 Side wall
12 Separating layer
S Welding spot

The invention claimed is:

1. A support used as a vehicle component, the support comprising:
    a longitudinal extension having a plurality of transverse extensions thereof, forming a transverse profile section;
    the support comprising a first support and a second support, both supports being arranged to enclose a cavity
    the transverse profile section of at least the first support having a substantially U-shaped cross-sectional geometry with a bottom connecting two side arms of the support;
    at least the first support further comprising at least one reinforcing element along the longitudinal extension of the support;
    the reinforcing element being connected to the first support in a positive or material fit manner, or in a tension- and shear-resistant manner;
    a separating layer between the reinforcing element and the first support in the longitudinal extension of the first support; and
    the reinforcing element only connected to the bottom and not attaching to the side arms of the U-shaped cross section and not attaching to the second support.

2. The support of claim 1, wherein the reinforcing element is configured as an insert and is connected to an inner side of the bottom of the first support.

3. The support of claim 1, wherein the reinforcing element comprises a transverse profile section.

4. The support of claim 1, wherein the first support comprises a first weldable material and the reinforcing element comprising a second material which can be welded to the first material, and the reinforcing element is connected by several welding spots produced by spot welding to the first support.

5. The support of claim 4, wherein the first support is made of a first metal material, and the reinforcing element is made of the same or another metal material which can be welded to the first material.

6. The support of claim 1, wherein the separating layer extends over the entire surface of the reinforcing element facing the first support and is not needed for connecting the reinforcing element to the first support.

7. The support of claim 6, wherein the spacing between reinforcing element and first support caused by the separating layer is at least largely constant over the longitudinal extension of the reinforcing element outside of a plurality of connection spots between reinforcing element and first support.

8. The support of claim 7, wherein the separating layer is configured as an adhesive layer.

9. The support of claim 8, wherein the adhesive layer is a layer which is cured under exposure to heat.

10. The support of claim 1, wherein the first support is a portion of the vehicle component comprising an additional support.

11. The support of claim 1, wherein the first support is a portion of a transmission carrier.

* * * * *